United States Patent [19]
Wirtz

[11] Patent Number: 4,848,084
[45] Date of Patent: Jul. 18, 1989

[54] HYDRODYNAMIC TORQUE CONVERTER HAVING VARIABLE STATOR PLATE ORIFICE

[75] Inventor: Hans P. Wirtz, Cologne, Fed. Rep. of Germany

[73] Assignee: Ford Motor Company, Dearborn, Mich.

[21] Appl. No.: 147,000

[22] Filed: Jan. 22, 1988

[30] Foreign Application Priority Data

Jan. 29, 1987 [DE] Fed. Rep. of Germany ....... 3702548

[51] Int. Cl.[4] ............................................ F16D 33/00
[52] U.S. Cl. ........................................ 60/342; 60/346; 415/147
[58] Field of Search ................... 60/341, 342, 345, 346; 415/146, 147, 161

[56] References Cited

U.S. PATENT DOCUMENTS

| | | |
|---|---|---|
| 2,162,543 | 6/1939 | Banner . |
| 2,612,754 | 10/1952 | Swift ..................................... 60/346 |
| 2,755,628 | 7/1956 | Mamo . |
| 3,014,430 | 12/1961 | Schneider . |
| 3,090,252 | 5/1963 | Mamo ............................... 60/346 X |
| 3,152,446 | 10/1964 | Foerster et al. ................... 60/346 X |
| 3,354,643 | 11/1967 | Paredes . |
| 3,478,621 | 11/1969 | Johnson et al. .................... 60/346 X |
| 3,934,414 | 1/1976 | Merkle et al. . |
| 4,051,931 | 10/1977 | Vignon . |
| 4,377,068 | 3/1983 | Braatz . |

FOREIGN PATENT DOCUMENTS

| | | |
|---|---|---|
| 1956244 | 6/1973 | Fed. Rep. of Germany . |
| 2350600 | 4/1975 | Fed. Rep. of Germany . |
| 2505092 | 1/1983 | Fed. Rep. of Germany . |
| 220259 | 11/1985 | Japan ..................................... 60/342 |

Primary Examiner—Edward K. Look
Attorney, Agent, or Firm—Frank G. McKenzie; Donald J. Harrington

[57] ABSTRACT

A hydrodynamic torque converter includes a pump wheel, a turbine wheel, and a stator wheel having a variable entrance between the blade rows upon at least one of these wheels, preferably on the stator wheel. The opening between the blades is adjustable automatically by the torque applied by the circulating fluid against the action of a compression spring. The blades on the wheel whose entrance is adjustable includes at least two annular members divided along a plane perpendicular to the axis of the wheel. The annular members are rotatable relative to one another approximately one-half blade pitch. The annular member becomes located in the inlet region of the blade row, is rotatable by the torque of the circulating flow only in the region of the installed condition against the force of the spring to a position that reduces the inlet cross section of the blade row.

4 Claims, 4 Drawing Sheets

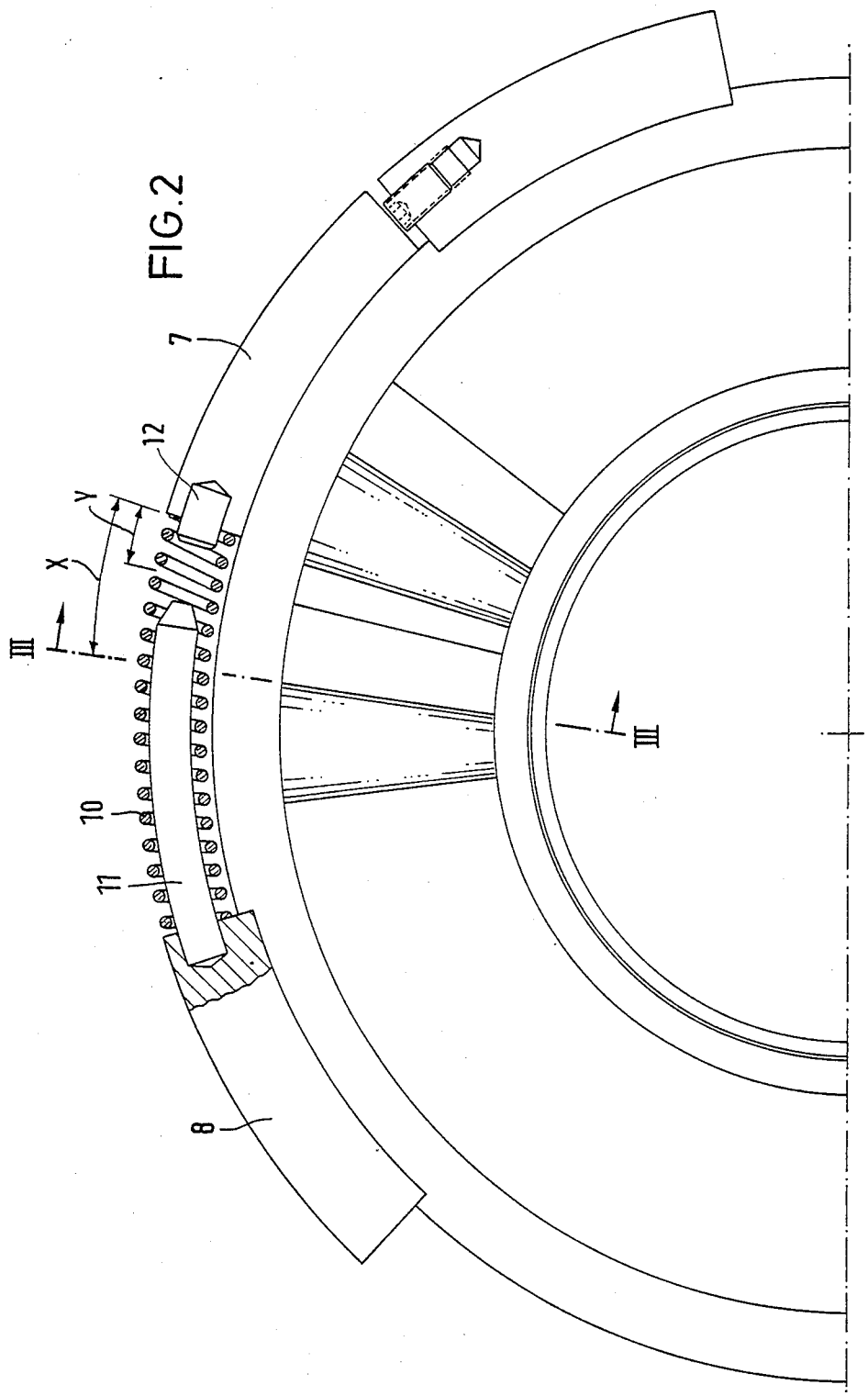

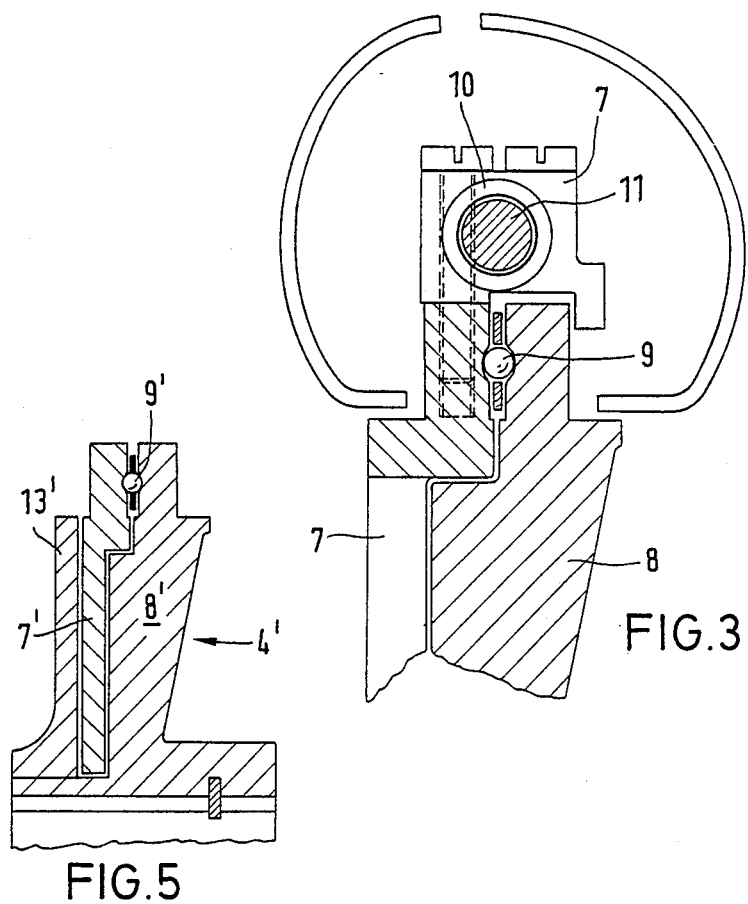
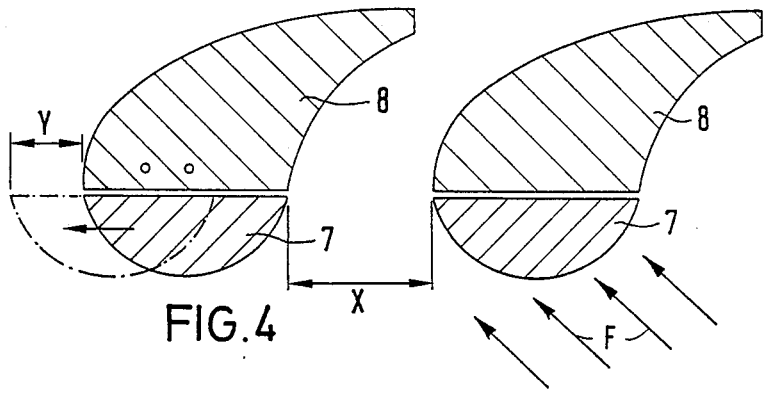

HYDRODYNAMIC TORQUE CONVERTER HAVING VARIABLE STATOR PLATE ORIFICE

BACKGROUND OF THE INVENTION

1. Field of the Invention

This invention relates to the field of torque converters that produce hydrodynamic driving connection between input and output members. The invention particularly relates to such torque converters used to connect an engine to an automotive transmission.

2. Description of the Prior Art

German Offenlegungsschrift No. 23 50 600 describes a hydrodynamic torque converter having a pump wheel, a turbine wheel driven from the pump wheel, and a guide wheel having a variable blade row on the guide wheel. The adjustment of the variable blade row occurs automatically and is actuated by pressure forces developed by the circulating fluid against the action of a restoring spring.

The blades of the guide wheel pivot on radially directed pivot pins, actuated by pivot arms bent at an angle and supported on an axially movable setting ring, and concentric cup springs positioned behind the ring. The position of the springs is selected such that the torque transmitted through the torque converter by the circulating hydraulic fluid flow when the torque converter is stalled, as when starting the motor vehicle from rest, opens the blade row of the guide wheel.

The torque performance figure is changed by pivoting the guide wheel blades such that the starting speed at full load is low, the creeping moment at idle speed is small, and the speed ratio at which the coupling point occurs and overall efficiency are acceptable. However, this torque converter is relatively complicated and the cost of manufacture and assembly is high.

German patent No. 25 05 092 describes a hydrodynamic torque converter having a guide wheel supported on one-way clutch wherein the direction of the fluid flowing between the blade rows of the entrance of the guide wheel is set by the torque exerted by the fluid against the force of a spring. The blades of the guide wheel rotate to adjust the opening. The blade row of the guide wheel is open at the starting point at full load, i.e., at the stall point, and the converter performance number in this instance is high. However, because the opening of the blade row of the guide wheel is almost closed in the idle condition, the corresponding converter performance number and creeping moment are small. This torque converter is complicated and expensive in design because the blades of the guide wheel are rotatably mounted to adjust the opening between the blade rows.

German Auslegeschrift No. 19 56 244 describes the use of a blade row of a guide wheel, which is divided into at least two annular members that are radially divided along a circle and rotate relative to one another about approximately half a blade pitch. The two annular members described in this document are actuated by a hydraulic cylinder located outside the torque converter.

SUMMARY OF THE INVENTION

The objects of the present invention are fundamentally different from the aim of the prior art devices. Here, an object is to diminish converter performance particularly in the vicinity of the starting or stall range so that a predetermined torque ratio is not exceeded. However, at speeds higher than the starting range the converter performance number is not altered by this invention. The performance number is an important factor in coordinating the combined performance of the engine and torque converter.

A purpose of the invention is to avoid overloading an automatic transmission when accelerating a motor vehicle from rest by an efficient internal combustion engine having a high output torque. The automatic transmission has a specific torque capacity and is driven by an engine through a hydrodynamic torque converter operating according to the principles of this invention. Such a torque converter can prevent the abrupt increase in torque at the staring point which could otherwise cause an undesired overloading of the automatic transmission.

BRIEF DESCRIPTION OF THE DRAWING

The invention is explained in greater detail with reference to embodiments illustrated in the accompanying drawing.

FIG. 2 is a partial elevation of the guide wheel taken in direction II in FIG. 1.

FIG. 3 is a partial cross section taken at plane III—III in FIG. 2.

FIG. 4 is a partial cross section taken at plane IV—IV in FIG. 1.

FIG. 5 is a partial cross section similar to that of FIG. 3 but of a second embodiment of this invention.

DESCRIPTION OF THE PREFERRED EMBODIMENT

Figure 1:
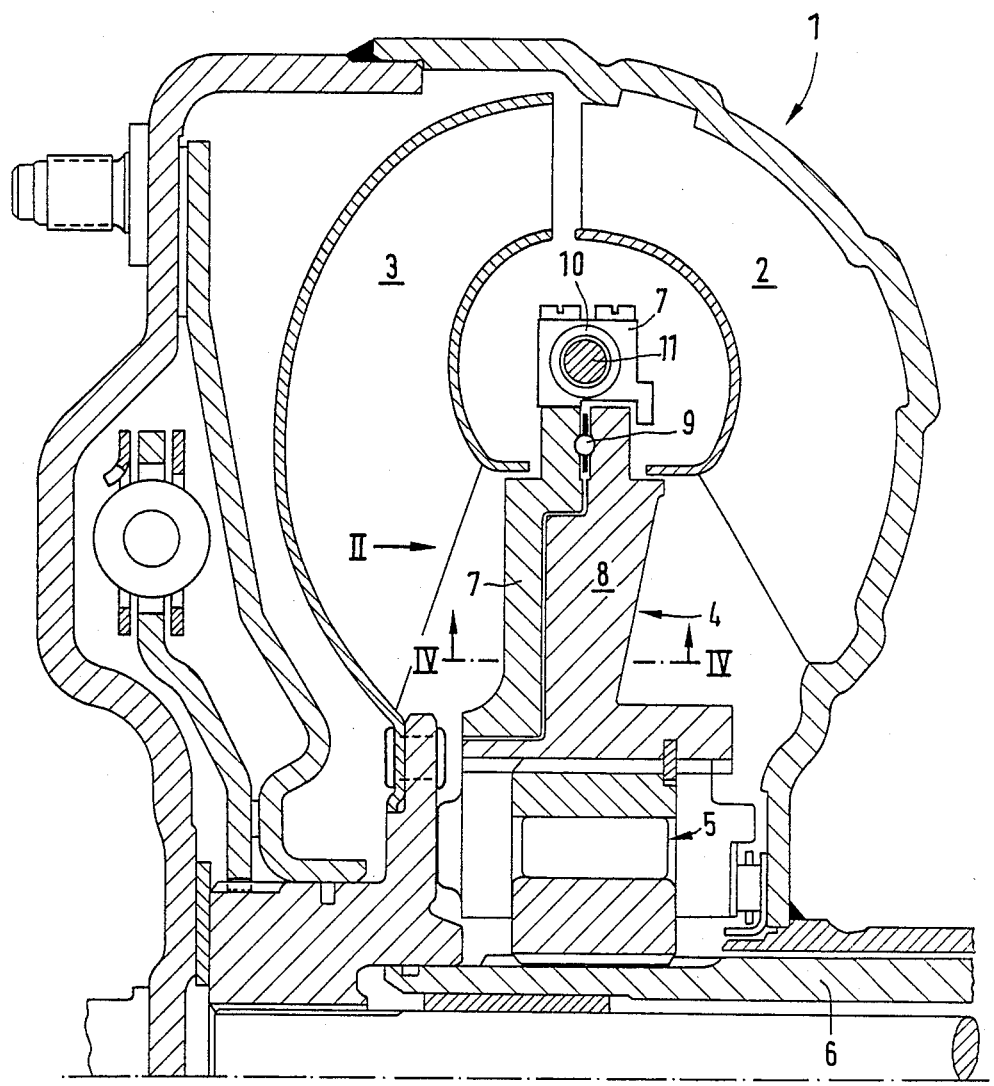
FIG. 1 is a cross section through the upper half of a hydrodynamic torque converter according to this invention.

Referring first to FIG. 1, a hydrodynamic torque converter 1 includes a pump wheel 2, a turbine wheel 3, and a guide wheel or stator wheel 4, which is supported in the conventional manner on an overrunning clutch 5 supported on a component 6 connected to the housing or chassis.

The stator wheel 4 comprises two annular members 7 and 8, which are divided along a plane perpendicular to the axis of the stator wheel for rotation of approximately one-half a blade pitch relative to one another. The annular members 7 and 8 are supported relative to one another by an axial ball bearing arrangement 9. Alternately, a sliding bearing can be substituted for the ball bearing 9.

Annular member 8 of the stator wheel is formed integrally with the hub of the stator wheel and is shown connected directly to the overrunning clutch 5. Annular member 7 is free to rotate relative to the clutch and member 8.

FIGS. 2 and 3 show a helical compression spring 10 extending circumferentially and located at the periphery of the stator wheel. The spring is guided on the annular member 8 by a tongue 11 extending circumferentially from annular member 8. One end of the helical spring is supported by pin 12 extending circumferentially from annular member 7. The length of the spring and the surfaces against which it acts are set so that a preload force is developed by the spring during the starting condition of the torque converter in the vicinity of the stall condition.

FIGS. 2 and 4 show that annular member 7 forms the rounded nose portion of the airfoil shaped blades of the stator wheel. Member 8 forms the trailing portion of the airfoil. Stator wheel 4 defines an inlet opening, which, throughout most of the operating range of the torque converter, has dimension X measured between the upper surface and the lower surface of adjacent blades on the stator wheel. Dimension X is reduced by dimension Y as annular member 7 rotates relative to annular member 8 against the force of helical spring 10 due to the torque exerted by the circulating fluid flow, indicated by the arrows F, operating on the rounded nose portion 7.

A second embodiment of the invention illustrated in FIG. 5 shows another arrangement of the guide wheel 4'. Here, an annular member 13' forms the rounded nose portion and is connected to annular member 8', which forms the trailing portion of the airfoil shaped blades of the stator wheel. The movable annular member 7' is displaceable by the annular dimension Y under the action of the torque developed by the circulating fluid flow.

Figure 6:
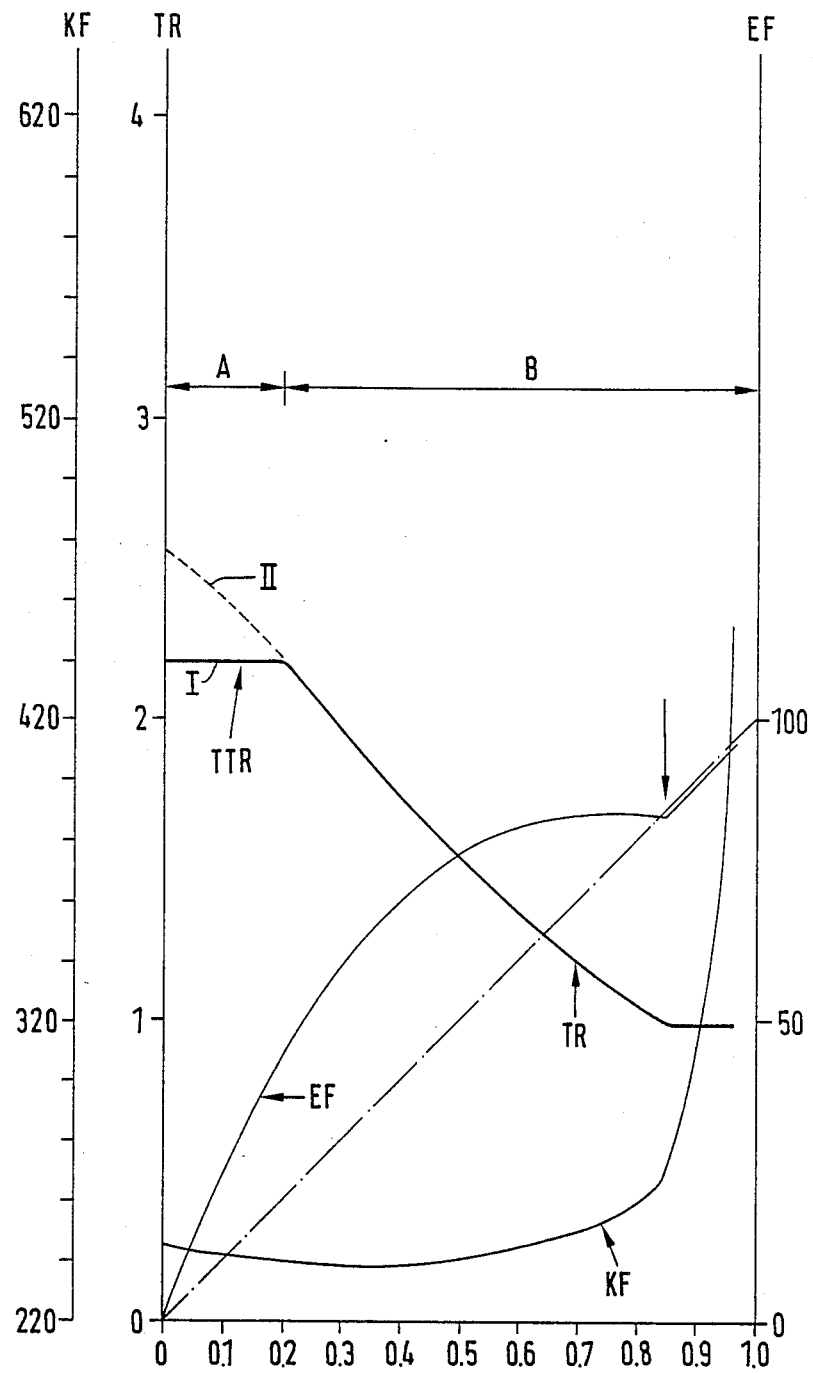
FIG. 6 is a diagram of the performance characteristics of the hydrodynamic torque converter of this invention.

The torque amplification developed by the torque converter is produced primarily by the effect of the stator wheel. This torque amplification is reduced or limited at the starting point or stall region from that of a conventional torque converter. The torque delivered by the turbine wheel 3 to the input of the automatic transmission is lower than otherwise would result with the use of a conventional torque converter. This reduction avoids overloading the transmission by an excessive starting torque produced by the engine and amplified by the torque converter. When the torque converter leaves the starting point, i.e., when the turbine wheel begins to rotate relative to the pump wheel 1, the angle of impact of the circulating fluid upon the blades of the stator wheel changes. Therefore, the torque on the movable annular member 7, 13' changes. As the speed ratio of the torque converter increases after the starting point, the displaceable annular member continually returns to the original inlet opening position on the stator wheel because of the effect of the restoring force of the compression helical spring 10. In this way, as shown by the diagram of FIG. 6, over the speed ratio range A the torque amplification is reduced to the magnitude I in comparison to the torque amplification II produced by the conventional torque converter.

A second speed ratio range B represents operation of the torque converter wherein the stator wheel of the present invention operates like the stator wheel of a conventional torque converter. In this range, the displaceable portion 7, 13' of the blades of the stator wheel are restored to the conventional location of FIG. 4. When the displaceable members are restored, the torque converter again produces the characteristic of high torque amplification, the magnitude II, throughout the major portion of its operating range to the coupling point, where the torque amplification is unity. Because the stator wheel is supported on the overrunning clutch 5, at the coupling point where the speeds of the turbine wheel and pump wheel are substantially the same, the stator wheel rotates freely in the circulating fluid flow.

In the partial load range of operation, i.e., when the engine torque falls, the rotational speed of the torque converter is reduced due to the effect of the fluids circulating within the torque converter. Therefore, the force on the movable annular member 7, 13' remains below the restoring force of the spring and the blades of the stator wheel are returned to the conventional position of FIG. 4. In the partial load range, the torque converter produces high torque amplification illustrated by line TR of the diagram of FIG. 6.

Having described preferred embodiments of my invention, what I claim and desire to secure by U.S. Letters Patent is:

1. A torque converter for hydrodynamically connecting a power source and a transmission comprising:
   a pump wheel adapted for connection to the power source and mounted for rotation about the axis of the torque converter, having multiple blades spaced angularly about said axis;
   a turbine wheel adapted for connection to the input shaft of the transmission, mounted for rotation about the axis of the torque converter, having multiple blades spaced angularly about said axis, said blades adapted to be hydrodynamically driven by fluid circulating within the torque converter between the pump wheel and the turbine wheel;
   an overrunning clutch;
   a stator wheel mounted on the overrunning clutch for rotation about the axis of the torque converter, having multiple blades spaced angularly about said axis, said blades being located in the flow path of the fluid between the pump wheel and the turbine wheel,
   the blades arranged in a row defining an inlet region between successive blades, each blade having an airfoil cross section including
   a first member forming a trailing portion of the airfoil;
   a second member forming a nose portion of the airfoil, moveable into and from the inlet region relative to the first member; and
   spring means for biasing the second member away from the inlet region, the first member being moveable by the effect of the circulating fluid to reduce the size of the inlet region between the blade rows.

2. The torque converter of claim 1 wherein the blades that define the inlet region comprise:
   bearing means located between the leading portion and the trailing portion for facilitating rotation of the second member relative to the first member.

3. The torque converter of claim 1 further comprising:
   first guide means extending angularly from the second member and located near the periphery of the group consisting of the pump wheel, turbine wheel and stator wheel on which the blade rows define the inlet region;
   second guide means extending angularly from the first member toward the first guide means and located near the periphery of the group consisting of the pump wheel, turbine wheel and stator wheel on which the blade rows define the inlet region; and
   wherein the spring means includes a coiled helical spring located between the first and second members, held in position by the first and second guide means.

4. The torque converter of claim 2 further comprising:
   first guide means extending angularly from the second member and located near the periphery of the group consisting of the pump wheel, turbine wheel and stator wheel on which the blade rows define the inlet region;

second guide means extending angularly from the first member toward the first guide means and located near the periphery of the group consisting of the pump wheel, turbine wheel and stator wheel on which the blade rows define the inlet region; and wherein the spring means includes a coiled helical spring located between the first and second members, held in position by the first and second guide means.

* * * * *